Nov. 11, 1930.          H. N. COX          1,781,496
APPARATUS FOR COLOR PHOTOGRAPHY
Original Filed April 27, 1928    2 Sheets-Sheet 1
Fig. I.
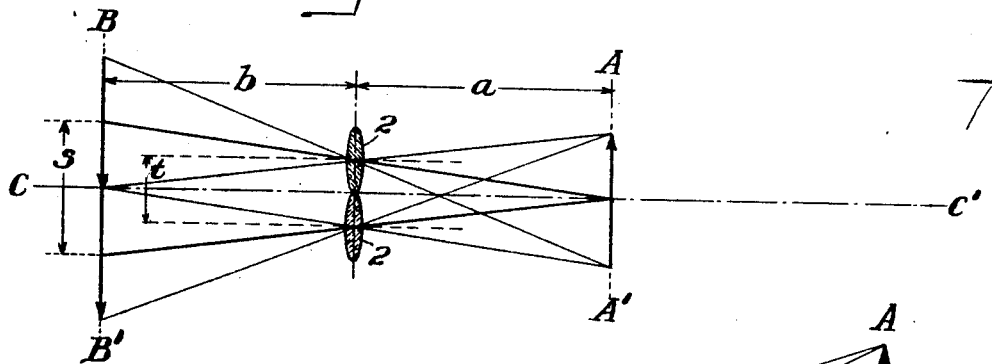
Fig. II.
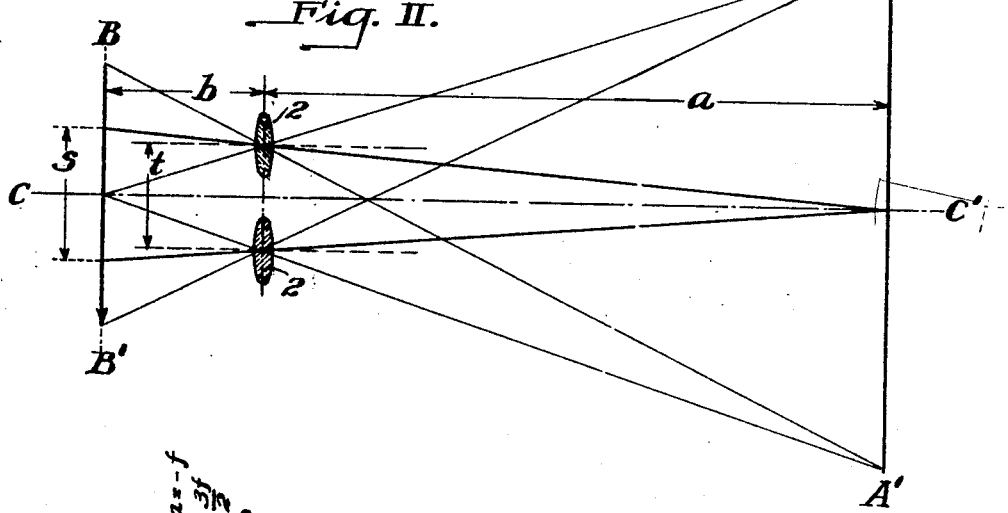
Fig. III.
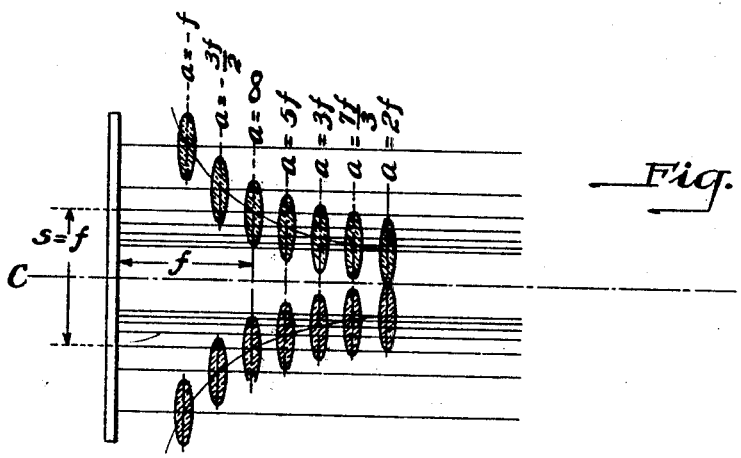
WITNESS
a.B.Wallace
INVENTOR
Harold N. Cox
by Christy and Christy
his attorneys Nov. 11, 1930.  H. N. COX  1,781,496
APPARATUS FOR COLOR PHOTOGRAPHY
Original Filed April 27, 1928   2 Sheets-Sheet 2
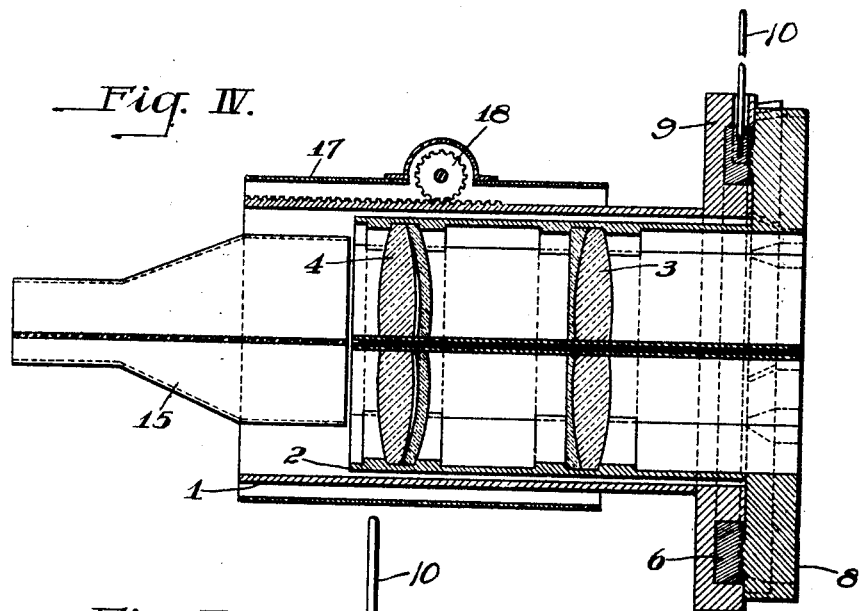
Fig. IV.
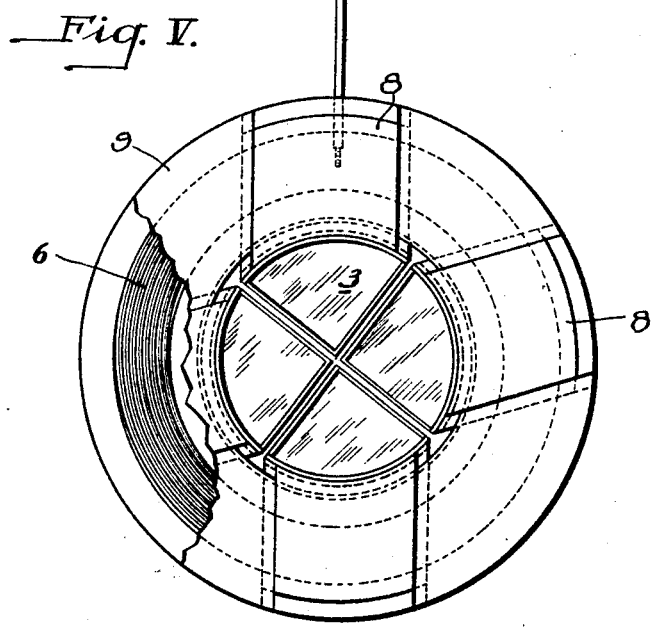
Fig. V.
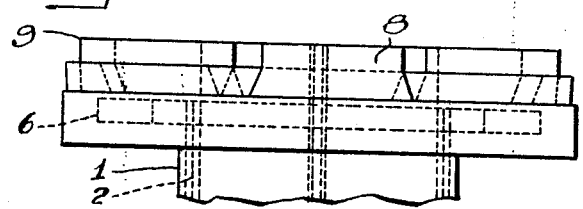
Fig. VI.
WITNESS
A. B. Wallace.
INVENTOR
Harold N. Cox
by Christy and Christy
his attorneys Patented Nov. 11, 1930

1,781,496

UNITED STATES PATENT OFFICE

HAROLD N. COX, OF GLEN RIDGE, NEW JERSEY, ASSIGNOR TO COX MULTI-COLOR PHOTO COMPANY, OF PITTSBURGH, PENNSYLVANIA, A CORPORATION OF DELAWARE

APPARATUS FOR COLOR PHOTOGRAPHY

Application filed April 27, 1928, Serial No. 273,257. Renewed September 19, 1930.

My invention relates to improvements in lens systems used in color photography. The lens system of my invention is applicable both in the camera used for taking the photograph and in the projector used for throwing the photograph upon the screen. It is applicable to apparatus for the taking and for the projecting either of still pictures or of motion pictures. The object in view is the maintenance of proper spacing and consequently accurate registry upon the screen where ultimately the picture is displayed, of the plurality of pictures projected to and from the film. Under the general term "film" I here include both the sensitive film of the camera and the film which in the projector carries the picture. Such registry may be maintained without the use of auxiliary objectives or prisms.

The invention is illustrated in the accompanying drawings. Figs. I and II are diagrams showing the relative positions of object (or screen), lens, and film. Fig. III is a diagram showing the relative positions of two lenses as their distance from the film changes in focusing. Fig. IV is a view in longitudinal section, showing a lens structure in which the invention is found. Fig. V is a view in end elevation (part broken away) and Fig. VI is a fragmentary view in side elevation of the same lens structure.

Referring first to Figs. I and II, A—A' is the object plane (or screen plane); B—B' is the image plane (or film); 2, 2 are the lenses of the multiple objective; C—C' is the axis of the instrument, from which the lenses are equidistantly spaced; $a$ indicates the distance between lens and object plane; $b$, the distance between lens and image plane; $s$ the space interval in the image plane between corresponding points of the multiple images; $t$ is the distance between the centers of the lenses, measured in the same axial plane as is $s$.

The center of lens,—as that term is used in this specification, will be understood to be the point on the principal axis of the lens, which would be at the center of an infinitely thin simple lens of the same refractive power as the lens employed.

Comparing Figs. I and II, it will be seen that the object plane A—A' is in Fig. II more remote from the instrument than in Fig. I, and that in consequence the spacing of the lenses 2 both one from another and from the image plane have been altered. And it will be perceived that while the space between lens and image plane has been changed, in order to maintain sharpness of definition in plane B—B' (or, with projector in mind, in the plane A—A'), the change in spacing between the lenses has been such that in both positions the center of each lens lies in straight lines connecting conjugate points in object and in image. Taking the focal length of the lens $f$, the equation here may be stated as follows:

Since $$\frac{t}{s}=\frac{a}{a+b}$$

and $$b=\frac{af}{a-f}$$

$$t=\frac{sa}{a+b}=\frac{s(a-f)}{a}=\frac{fs}{b}$$

The equation, therefore, of the curve in which the optical center of the lens moves as focusing is effected is $$t=\frac{fs}{b}$$

In Fig. III this curve is plotted. In this particular instance (Fig. III) $s=f$.

Turning from the diagrams to Figs. IV, V, and VI, the structure includes a barrel 1 which carries the lens units, and which is itself adjustable in a second barrel 17 by suitable means, conventionally indicated at 18. The barrel 17 thus serves as a support for the adjustable barrel 1. The lens units, of which in this case there are four, include each a carrier 2, a front lens combination 3 and a rear lens combination 4. Means are provided for moving these lens units simultaneously in radial direction. The barrel 1 is provided terminally with a transversely extending flange 9; in the face of this flange, slide-ways are formed, in which blocks 8 may move radially, and the engagement of the blocks in the slide-ways is dovetailed as the drawings show; the blocks 8 form extensions upon the barrels 2 of the lens units. Consequently, as the blocks move radially in their slide-ways, the barrels 2 are adjusted radially with respect to the common axis of the lens assembly. Means are provided for wedging the blocks inwardly and outwardly along their slide-ways. To this end an adjusting ring 6 is rotatably mounted in a circular recess formed for it in the face of flange 9, and this ring is provided with a handle 10. The handle extends through a circumferentially elongated slot in flange 9, and constitutes means for rotating the ring 6 in its recess. The ring 6 and the blocks 8 engage one another in a spiral thread engagement formed in their transversely disposed proximate surfaces. By virtue of such engagement, rotation of ring 6 effects the simultaneous radial movement of the lens units, inward and outward, according to the direction of the turning of the ring. Partitions 15 constitute light barriers to segregate the light transmitted through each lens unit.

In the taking and projecting of pictures it is found that the films vary in their actual dimensions, the variations being due to temperature, age, length of service, and other circumstances; and such variation may amount to as much as 1.5%. This, a matter of little or no consequence in single image work, becomes a source of difficulty and embarrassment in multiple image work. I have perceived that, since in the taking of the picture a definite relationship was established between the actual dimensions of the film and the spacing apart of the lens elements 2, 2, it becomes necessary in subsequent projection in order to effect registry of the images, that a corresponding relationship be established; and that focusing be effected without disturbance of that relationship. I have solved the difficulty by mounting the multiple lens units 2, 2 for adjustment both in radial and in longitudinal direction, and in making those two adjustments independent one of another.

In projecting the picture focus is obtained by moving the lens units longitudinally; and correct focus having thus been attained, registry of the several images is obtained by moving the lens units radially.

Referring again to the diagram (Fig. 1), while it is true that the equation $$t = \frac{fs}{b}$$

must be maintained, the fact that $s$ is a variable necessitates compensation. By the independence which I have shown and described of the two adjustments, it becomes possible, whatever be the actual values of $s$, to establish the relationship expressed in the equation.

It will be remarked of the structure of Fig. IV that the lens units are severally complete, each independent of the other, and each is capable of projecting its own image. The plurality of units are arranged on parallel axis and are adjustable in unison in axial direction and are adjustable oppositely in transverse direction. They are arranged to project from a film extending in a single plane a plurality of images upon a screen. These images may be brought to registry by the transverse adjustment of the lens units, and they may be brought to focus by the longitudinal adjustment of the lens units.

I claim as my invention:

1. In apparatus for color photography a support, a lens barrel borne by said support, means for adjusting said lens barrel in axial direction upon said support, a plurality of lenses borne each in a separate carrier and arranged within said lens barrel, with axes parallel one to another and to the axis of the barrel, the carriers being mounted upon said lens barrel, and being movable radially in such mounting, and an adjusting ring borne by and rotatable upon said lens barrel, and encircling said lens barrel, said carriers and said adjusting ring engaging one another over surfaces of spiral extent with respect to the axis of the lens barrel.

2. In apparatus for color photography a support, a lens barrel borne by said support, means for adjusting said lens barrel in axial direction upon said support, a plurality of lenses borne each in a separate carrier and arranged within said lens barrel, with axes parallel one to another and to the axis of the barrel, the carriers being mounted upon said lens barrel, and being movable radially in their mounting, and an adjusting ring borne by and rotatable upon said lens barrel and engaging simultaneously the carriers of all of said lenses over spirally threaded surfaces extending in a plane to which the axes of the lenses are normal.

In testimony whereof I have hereunto set my hand.

HAROLD N. COX.